Patented Feb. 18, 1941

2,232,429

UNITED STATES PATENT OFFICE 2,232,429

COMPOSITION OF MATTER

Nicholas Bennett, Widnes, England, assignor to Imperial Chemical Industries Limited, a corporation of Great Britain No Drawing. Application April 1, 1938, Serial No. 199,524. In Great Britain April 30, 1937

9 Claims. (Cl. 260—735)

This invention relates to novel compositions of matter, and more particularly to compositions containing chlorinated rubber.

Many proposals have been made for preparing plastic and thermoplastic masses containing chlorinated rubber by incorporating with it such materials as vegetable oils, alkylated naphthalenes, and chlorinated hydrocarbons such as chlorinated naphthalenes. In co-pending application Serial No. 153,675 filed July 14, 1937, I have described the preparation of compositions containing chlorinated rubber and the product obtained by condensing a chlorinated aromatic hydrocarbon with a chlorinated aliphatic hydrocarbon.

This invention has as an object the manufacture of new and useful compositions of matter. Further objects reside in non-inflammable plastic masses comprising chlorinated rubber compositions and methods for obtaining such compositions. Other objects will appear hereinafter.

I have now found that substantially non-inflammable compositions of matter can be obtained by incorporating with chlorinated rubber a material obtained by halogenating the product of a condensation between an aromatic hydrocarbon and a hydrocarbon containing a halogenated aliphatic grouping. I find that by such a method, compositions are obtained which have a large proportion of halogen bound in a stable manner, and exhibit a high resistance to flames.

Typical compounds having halogenated aliphatic groupings which may be used for the condensation, include methylene chloride, ethylene chloride, trichlorethylene, propyl chloride, chlorinated paraffin wax, and benzyl chloride, while suitable aromatic hydrocarbons with which to condense such chlorinated compounds are benzene and its homologues or naphthalene.

The condensation is suitably effected in known manner in the presence of a catalyst consisting of an anhydrous metallic chloride such as aluminum chloride, or in the presence of boron halide or other catalysts used in the Friedel-Crafts reaction. Thus the reactants are mixed and the catalyst gradually added as evolution of gas proceeds. Alternatively, the catalyst may be mixed with one of the reactants, and the other reactant then gradually added. Diluents may be added to facilitate the reaction, and heat may be applied during the whole or part of the condensation. The crude condensation product may be halogenated, e. g. chlorinated either immediately or after a distillation or similar purification step. The condensation product is usually a high boiling viscous liquid or a solid, and in order to facilitate the chlorination it may be dispersed in a solvent such as carbon tetrachloride. A halogen carrier, e. g. anhydrous ferric chloride, may be added and chlorination carried out in the dark so that only nuclear substitution occurs. Alternatively the material may be heated until it is in a mobile condition, and chlorine then passed in.

The final material may be incorporated with the chlorinated rubber without any purification, or it may be distilled, extracted with a suitable solvent, or otherwise treated to purify it beforehand.

The incorporation of the chlorinated condensation product with the chlorinated rubber may be performed in any convenient manner, e. g. by milling the two in a Werner-Pfleiderer mixer or a Baker-Perkins mixer, or one or both of the constituents may be dissolved in a common solvent prior to mixing, and the solvent subsequently removed by evaporation. Fillers, pigments, and known plasticizers such as tricresyl phosphate or dibutyl phthalate may also be added.

The following examples illustrate the preparation of a typical intermediate product and the preparation of the composition according to my invention, all parts being by weight:

Example I

Three hundred twelve (312) parts of benzene and 30 parts of anhydrous aluminum chloride were heated to 60°–70° C., and 90 parts of ethylene dichloride were added. When evolution of hydrochloric acid had ceased, water was added and the mass agitated for an hour. It was then neutralized with lime and distilled under reduced pressure. One part of anhydrous ferric chloride was added to the distillate, which was then chlorinated by heating it to 50° C. and passing in 600 parts of chlorine. The product was then incorporated with an equal weight of chlorinated rubber by dissolving each in toluene, mixing the two solutions and evaporating off the toluene.

Example II

Six hundred fifty (650) parts of chlorinated paraffin wax (25.4% chlorine) were gradually added to a stirred mixture of 1056 parts of benzene and 60 parts of aluminum chloride at 20° C. After addition was complete, the mixture was heated to 80° C. for four hours, treated with water and heated to 300° C. The oil thus obtained was filtered and chlorinated at 90° C. in the presence of light to a chlorine content of 17.2%. A plastic composition containing 40% chlorinated rubber and 60% of the above chlorinated condensation product was made by incorporating the two constituents in a Werner-Pfleiderer mixer.

The products of this invention are useful in the preparation of coating compositions of various types and they may be used either with or without incorporated pigments, filler, etc. Such coating compositions may be applied to various types of rigid or semi-rigid surfaces as metals of various kinds, wood, glass, rubber and rubber-like products, synthetic resin products, etc. The plastic masses may be used as such for producing molded products, for preparing insulating material, for luteing compounds, etc. In general the products may find application wherever chlorinated rubber compositions are useful but because of their greatly enhanced fire resistant properties they find extended use over those uses to which the usual chlorinated rubber compositions are applied.

As many apparently widely different embodiments of this invention may be made without departing from the spirit and scope thereof, it is to be understood that I do not limit myself to the specific embodiments thereof except as defined in the appended claims.

I claim:

1. A composition of matter comprising chlorinated rubber and the product obtained by halogenating the material obtained by reacting in the presence of a Friedel-Crafts catalyst an aromatic hydrocarbon with a hydrocarbon having at least one halogen atom attached to an acyclic carbon atom.

2. The composition set forth in claim 1 in which said aromatic hydrocarbon is benzene.

3. The composition set forth in claim 1 in which said aromatic hydrocarbon is naphthalene.

4. The composition set forth in claim 1 in which said aromatic hydrocarbon is benzene and said hydrocarbon containing a halogenated aliphatic group is ethylene chloride.

5. The composition set forth in claim 1 in which said aromatic hydrocarbon is benzene and said hydrocarbon containing a halogenated alialiphatic group is chlorinated paraffin.

6. The composition set forth in claim 1 in which said aromatic hydrocarbon is benzene and said hydrocarbon containing a halogenated aliphatic group is benzyl chloride.

7. The composition set forth in claim 1 in which said aromatic hydrocarbon is naphthalene and said hydrocarbon containing a halogenated aliphatic group is ethylene chloride.

8. The composition set forth in claim 1 in which said aromatic hydrocarbon is naphthalene and said hydrocarbon containing a halogenated aliphatic group is chlorinated paraffin.

9. The composition set forth in claim 1 in which said aromatic hydrocarbon is naphthalene and said hydrocarbon containing a halogenating aliphatic group is benzyl chloride.

NICHOLAS BENNETT.